United States Patent [19]

Brandstetter et al.

[11] 4,410,654
[45] Oct. 18, 1983

[54] THERMOPLASTIC MOLDING MATERIALS

[75] Inventors: Franz Brandstetter, Neustadt; Helmut Muenstedt, Wachenheim; Edmund Priebe, Frankenthal, all of Fed. Rep. of Germany

[73] Assignee: BASF Aktiengesellschaft, Ludwigshafen, Fed. Rep. of Germany

[21] Appl. No.: 365,527

[22] Filed: Apr. 5, 1982

[51] Int. Cl.$^3$ .............................................. C08K 3/34
[52] U.S. Cl. ................................... 524/487; 524/508; 524/540
[58] Field of Search ..................... 524/487, 508, 540

[56] References Cited

U.S. PATENT DOCUMENTS 3,383,435  5/1968  Cizek .................................... 525/132
4,128,602 12/1978  Katchman ............................... 525/68
4,128,603 12/1978  Katchman et al. ...................... 525/68
4,128,604 12/1978  Katchman et al. ...................... 525/132

Primary Examiner—Melvyn I. Marquis
Attorney, Agent, or Firm—Norbert M. Lisicki

[57] ABSTRACT

Thermoplastic molding materials based on impact resistant styrene polymers and polyphenylene ethers containing a hydrocarbon wax having a melt viscosity of less than 500 centistokes at 120° C.

3 Claims, No Drawings

THERMOPLASTIC MOLDING MATERIALS

BACKGROUND OF THE INVENTION

1. Field of the Invention

The invention concerns thermoplastic molding materials based on impact resistant styrene polymers and polyphenylene ethers.

2. Prior Art

Thermoplastic materials which are suitable for the manufacture of molded parts and which contain impact resistant styrene polymers and polyphenylene ethers are described for instance in U.S. Pat. Nos. 3,383,435, 4,128,602 and 4,128,603. Such molding materials are suited for the manufacture of molded parts which are characterized by a better dimensional stability when exposed to heat compared with impact resistant styrene polymers which are not mixed with polyphenylene ethers. The physical properties of such molding materials are generally satisfactory, but it has been found that their flowability is poor.

SUMMARY OF THE INVENTION

Therefore, the purpose of this invention was the development of thermoplastic molding materials with improved flowability based on impact resistant styrene polymers and polyphenylene ethers.

In accordance with this invention, this requirement is met by molding materials which contain 0.1 to 5 percent by weight of a hydrocarbon wax with a melt viscosity below 500 cSt measured at 120° C. in addition to the impact resistant styrene polymers and the polyphenylene ethers.

DESCRIPTION OF THE PREFERRED EMBODIMENTS

Molding materials are understood to be unformed mixtures which can be processed into molded parts or semi-finished goods by thermoplastic processing within certain temperature ranges. The molding materials may be present in the form of granules, but they may also be powders or may be preformed by pelletizing or may be present in the form of panels or foils.

The thermoplastic molding materials may contain impact resistant styrene polymers and polyphenylene ethers in any desired quantities, for example, in quantities of 5 to 90 percent by weight of styrene polymers and 95 to 10 percent by weight of polyphenylene ether. Particularly well suited for the manufacture of molded parts are those molding materials which contain 20 to 80 percent by weight of impact resistant styrene polymers and 80 to 20 percent by weight of polyphenylene ether.

The most frequently used processes for the manufacture of impact resistant styrene polymers are the polymerization processes in bulk or solution as described, for example, in U.S. Pat. No. 2,694,692 and the processes for bulk-suspension polymerization as are described for instance in U.S. Pat. No. 2,862,906. However, other processes such as polymerization in emulsion may also be used.

Suitable monovinyl aromatic compounds are particularly styrene and the nucleous or side chain alkylated styrenes. However, styrene is used on a preferred basis.

Suitable rubbers include polymers with glass temperatures below 0° C., preferably below −20° C. In addition to natural rubber, suitable rubbers, in the sense of this invention, include polybutadiene, polyisoprene and mixed polymers of butadiene and/or isoprene with styrene, alkylates of acrylic acid with 2 to 8 carbon atoms in the alkyl radical and with acrylonitrile, polymers of alkylates of acrylic acid with 2 to 8 carbon atoms in the alkyl radical, polyisobutylene and rubbers based on ethylene-propylenediene.

Particularly well suited are butadiene polymers having a 1,4-cis content which lies between 25 and 98 percent. The preparation of the polystyrenes modified to be impact resistant may take place in bulk, solution, bulk-suspension or emulsion. These substances are preferably prepared by polymerization of the monovinyl aromatic compounds in the presence of the rubber. As previously mentioned, the polymerization generally takes place in a well-known manner in bulk, solution or aqueous dispersion with the rubber initially being dissolved in the polymerizable monomer and this starting solution then being polymerized.

The polyethers are compounds based on polyphenylene oxides, di-substituted in the ortho-position, wherein the ether oxygen of the one unit is bonded to the benzene nucleous of the adjacent unit. At least 50 units should be bonded to each other. The polyethers may contain hydrogen, halogen hydrocarbons which do not have any tertiary hydrogen atom in the α-position, halogenated hydrocarbons, phenyl radicals and hydrocarbon-oxy-radicals in the ortho-position to the oxygen. Thus, the following substances may be used: poly(2,6-dichloro-1,4-phenylene)-ether, poly(2,6-diphenyl)-1,4-phenylene)-ether, poly(2,6-dimethoxy-1,4-phenylene)-ether, poly(2,6-dimethyl-1,4-phenylene)-ether, poly(2,6-dibromo-1,4-phenylene)-ether. Preferably used is poly(2,6-dimethyl-1,4-phenylene)-ether. Particularly preferred are poly(2,6-dimethyl-1,4-phenylene)-ethers with a limiting viscosity between 0.40 and 0.65 dl/g (measured in chloroform at 30° C.).

The aromatic polyethers may be produced by self-condensation of the corresponding monofunctional phenols by the action of oxygen in the presence of a catalyst system, as is described, for example, in U.S. Pat. Nos. 3,219,625, 3,306,874, 3,306,875, 3,956,442, 3,965,069 and 3,972,851.

The hydrocarbon waxes have a molecular structure which are predominantly straight chain or which have an increased degree of branching, a solidification point above 65° C., and a melt viscosity below 500 cSt, preferably below 100 cSt measured at 120° C. Particularly preferred are hydrocarbon waxes having a melt viscosity of 4 to 20 cSt measured at 120° C.

Such products are generally commercially available.

The thermoplastic molding materials in accordance with this invention contain 0.1 to 5 weight percent, preferably 0.5 to 2 weight percent of hydrocarbon wax based on the total weight of molding material. The mixtures of the impact resistant styrene polymers, polyphenylene ethers and the zinc salt or salts may also contain additional additives such as pigments, dyestuffs, fillers, flame retardants, other compatible polymers, antistatics, antioxidants and additional lubricants.

The thermoplastic molding materials according to this invention are produced by using commonly applied methods using equipment which permit homogeneous mixing such as kneaders, extruders or roller mixers. In addition to generally good physical properties, the molding materials according to this invention have improved flow properties.

The following Examples are intended to exemplify the invention. All parts are by weight unless otherwise designated.

The melting index was determined in accordance with DIN 53 735 at 250° C.

TABLE

| Examples | Polystyrene modified to be impact resistant (pbw) | Type | Poly(2,6-dimethyl-1,4-phenylene)-ether (pbw) | Hydrocarbon wax melting viscosity at 120° C. (cSt) | (pbw) | Melting viscosity at 21.5 (g/10') |
|---|---|---|---|---|---|---|
| 1 | 75 | I | 24.5 | 4–6 | 0.5 | 94 |
| 2 | 75 | I | 24 | 4–6 | 1 | 113 |
| 3 | 65 | I | 34 | 4–6 | 1 | 66 |
| 4 | 55 | I | 44.5 | 4–6 | 0.5 | 11 |
| 5 | 55 | I | 44 | 4–6 | 1 | 15 |
| 6 | 75 | II | 24 | 4–6 | 1 | 141 |
| 7 | 65 | II | 34 | 4–6 | 1 | 86 |
| 8 | 55 | II | 44 | 4–6 | 1 | 23 |
| 9 | 75 | II | 24 | 7–10 | 1 | 139 |
| Comparison Examples | | | | | | |
| A | 75 | I | 24 | 1,300 | 1 | 95 |
| B | 55 | I | 44 | 1,300 | 1 | 9 |
| C | 75 | II | 24 | 1,300 | 1 | 11 |
| D | 55 | II | 44 | 1,300 | 1 | 18 | pbw = parts by weight

EXAMPLES AND COMPARISON EXAMPLES

The parts by weight of the impact resistant polystyrene, of the poly(2,6-dimethyl-1,4-phenylene)-ether with a limiting viscosity of 0.60 dl/g (measured at 30° C. in chloroform) and of the hydrocarbon wax listed in the table with 0.8 parts by weight of tris(nonylphenyl)-phosphite and 1.5 parts by weight of polyethylene each were melted, homogenized, mixed and granulated in a double shaft extruder at 280° C.

The following substances were used as impact resistant polystyrene:
I. average particle size 1 micron; particle size distribution in the range from 0.5 to 3 microns.
II. average particle size 2.5 microns; particle size distribution in the range from 0.3 to 10 microns.

The embodiments of the invention in which an exclusive privilege or property is claimed are defined as follows:

1. A thermoplastic molding material comprising an impact resistant styrene polymer and polyphenylene ether wherein the molding material contains 0.1 to 5 percent by weight, based on the mixture of styrene polymer and polyphenylene ether, of a hydrocarbon wax having a melt viscosity of less than 500 centistokes measured at 120° C.

2. The thermoplastic molding material of claim 1 wherein the concentration of hydrocarbon wax is from 0.1 to 5 weight percent based on the total weight of molding material.

3. The thermoplastic molding material of claim 1 wherein the concentration of hydrocarbon wax is from 0.5 to 2 weight percent based on the total weight of molding material.

* * * * *